(12) United States Patent
Powell

(10) Patent No.: US 8,260,099 B2
(45) Date of Patent: Sep. 4, 2012

(54) RECONFIGURABLE OPTICAL ADD/DROP MULTIPLEXER

(75) Inventor: Donald Andrew Powell, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/901,662

(22) Filed: Oct. 11, 2010

(65) Prior Publication Data

US 2011/0026929 A1    Feb. 3, 2011

Related U.S. Application Data

(62) Division of application No. 10/236,194, filed on Sep. 6, 2002, now Pat. No. 7,813,601.

(51) Int. Cl.
*G02B 6/28* (2006.01)
(52) U.S. Cl. ........................................................ 385/24
(58) Field of Classification Search ...................... 385/24
See application file for complete search history.

(56) References Cited

U.S. PATENT DOCUMENTS

| 6,263,123 | B1 | 7/2001 | Bishop et al. |
| 6,337,935 | B1 | 1/2002 | Ford et al. |
| 2002/0044722 | A1 | 4/2002 | Tew |
| 2002/0079432 | A1 | 6/2002 | Lee et al. |
| 2002/0141687 | A1 | 10/2002 | Iyer et al. |
| 2002/0146198 | A1* | 10/2002 | Strasser et al. ................. 385/17 |
| 2002/0159679 | A1* | 10/2002 | Strasser et al. ................. 385/16 |
| 2002/0181858 | A1* | 12/2002 | Bouevitch ....................... 385/24 |

OTHER PUBLICATIONS

Yoder et al., "Spatial Light Modulators: Technology and Applications", DLP Technology: Applications in Optical Networking, 4457 Proceed. SPIE 277 (Uzi Efron Ed.), Jul. 31, 2001.

* cited by examiner

*Primary Examiner* — Uyen Chau N Le
*Assistant Examiner* — Hoang Tran
(74) *Attorney, Agent, or Firm* — Warren L. Franz; Wade J. Brady, III; Frederick J. Telecky, Jr.

(57) ABSTRACT

Disclosed is an add-drop multiplexer that receives an optical signal having a plurality of channels. The multiplexer spatially separates the channels, and a spatial light modulator within the multiplexer, which in some embodiments is a switched blazed grating, routes the channels along first or second paths according to whether the particular channels are to be sent along as a part of an output communication signal or "dropped" into a dropped-channel optical communications signal. The add-drop multiplexer is also operable to receive optical channels to be added to an optical signal and to use a spatial light modulator to add those optical signals to that optical signal.

11 Claims, 8 Drawing Sheets

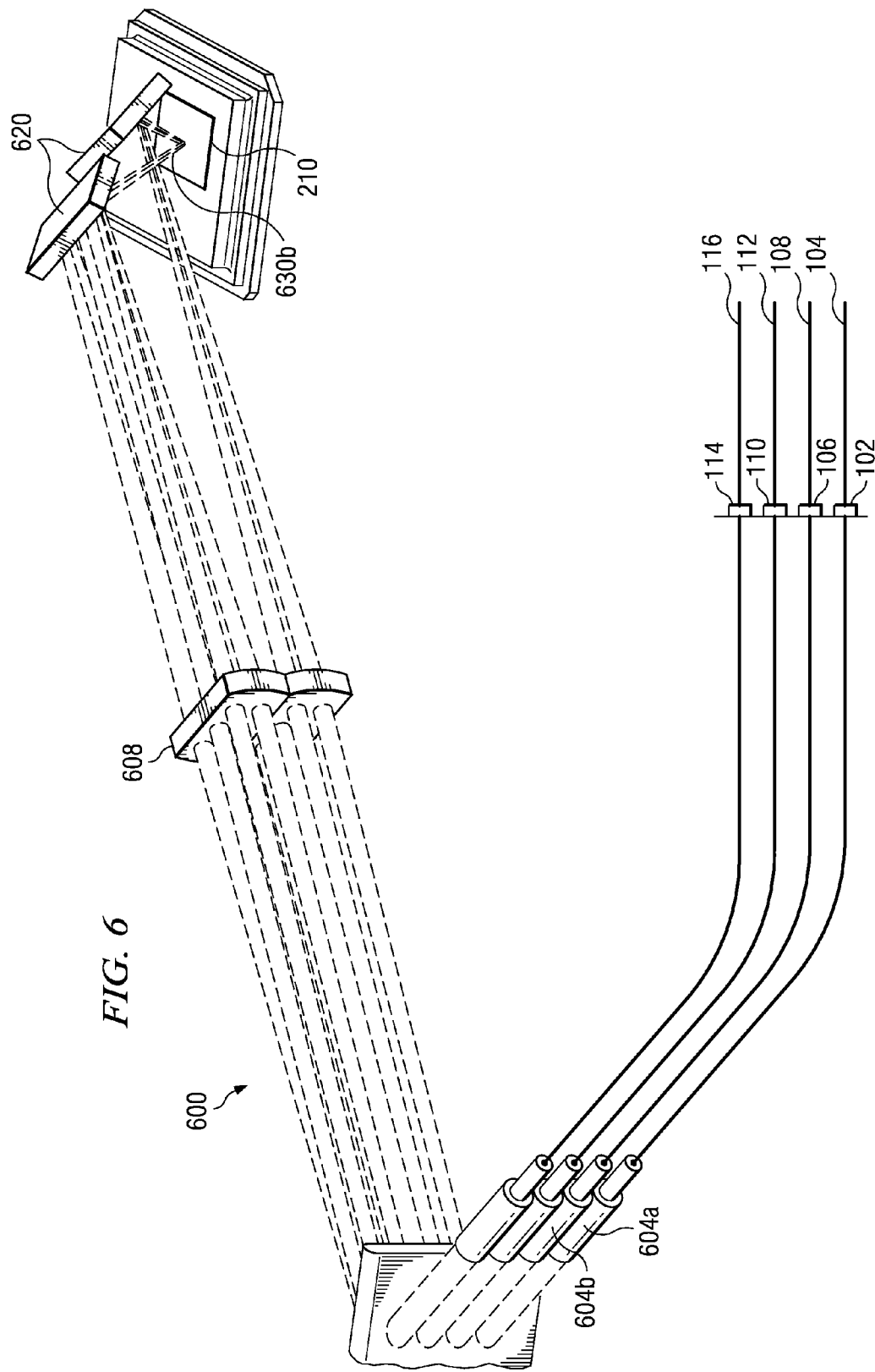

RECONFIGURABLE OPTICAL ADD/DROP MULTIPLEXER

This application is a divisional of application Ser. No. 10/236,194, filed 9/06/2002.

TECHNICAL FIELD

Described in this application are spatial light modulator based systems configured to add and drop communications channels onto and from an optical communication signal.

BACKGROUND

In optical networks, optical components such as optical add/drop multiplexers are used to add and drop channels from optical communication signals such as Dense Wavelength Division Multiplexed ("DWDM") optical signals. For example, a DWDM signal may have 160 channels, and those 160 channels (numbered n=1 to 160) each carry data at a certain optical carrier wavelength ($\lambda_n$). In such an optical network, the add-drop multiplexers can pull single or multiple communications channels off from the incoming multiplexed is optical signal and can selectively add new communications channels into the outgoing multiplexed optical signal.

Known add/drop multiplexer systems use fiber Bragg gratings as principal elements. These known systems are reconfigurable through the use of tunable optical filtering elements. For example, the Bragg gratings can be temperature-tuned, such that the reflection wavelength is shifted in or out of an optical channel band. Operationally, such Bragg gratings can be tuned to lie between optical channel bands or tuned to an optical channel band. When the grating reflection wavelength is tuned to an optical channel band, the corresponding optical channel is dropped. When the grating reflection wavelength is tuned out of an optical channel band, the corresponding optical channel is a "through" channel, i.e., a channel that is transmitted unaffected through add-drop multiplexer. In another technique, the gratings are mechanically strained to shift the reflection wavelength in or out of optical channel bands. Alternatively, the gratings can be thermally or mechanically tuned to different optical channels. In this manner, control of either temperature or mechanical strain functions to create a reconfigurable add-drop multiplexer. Exemplary such systems are described in U.S. Pat. Nos. 5,712,932, 5,748,349, 5,778,118, 5,786,914, 6,108,468, and 6,256,428.

A plurality of these gratings can be lined up along a fiber in order to pull off multiple channels, but each such grating inevitably causes some signal insertion loss and/or interference and/or cross-talk between channels. Thus, reconfigurable add-drop multiplexers that can add and drop multiple channels are difficult to implement efficiently using known technologies.

SUMMARY

Rather than using tunable Bragg fiber gratings to pull off certain wavelength channels from the DWDM, it is possible to spatially separate all the channels independently and to use a Digital Micromirror Device ("DMD") to independently route the wavelength channels, depending on the collective orientation of the group of mirrors upon which each particular wavelength channel is directed. The use of DMD devices for Digital Light Processing ("DLP") in the telecommunications arena was discussed in Lars Yoder et al., "DLP™ Technology: Applications in Optical Networking," SPATIAL LIGHT MODULATORS: TECHNOLOGY AND APPLICATIONS, 4457 Proceed. SPIE 277 (Uzi Efron ed.), which is incorporated by reference herein.

In embodiments described below, a fixed Bragg grating is used to separate out the channels of the DWDM optical signal, where the channels are numbered from n=1 to N. The wavelength channels are accordingly designated from first channel, $\lambda_1$, to a second channel, $\lambda_2$, to third channel, $\lambda_3$, and so on, up until an Nth channel, $\lambda_N$. Optics within the add-drop multiplexer direct the optical spots for the different channels onto segments of pixels on the DMD. In these embodiments, the incident angle of the light from a first optical path directed onto the DMD is optimized such a main diffraction order from the periodic pattern of the DMD is directed toward a second optical path. The light is reflected and directed along that second optical path when the DMD pixels are set in a first orientation, and the light is reflected back along the first optical path (in the opposite direction from the incoming light along that path) when the DMD pixels are set in a second orientation.

The flexibility of this reconfigurable DMD approach to the optical add/drop multiplexer allows all the channels to be selectively dropped from or added to the optical signal—in embodiments described below, a DWDM optical signal—without having to chain multiple tunable Bragg gratings or other optical components and without having to suffer the corresponding insertion loss that comes from the effect of those optical components.

BRIEF DESCRIPTION OF THE DRAWINGS

FIG. 6 shows an embodiment of a multiplexer of a similar design to the multiplexer of FIG. 2, but in which circulators are not used;

Figure 1:
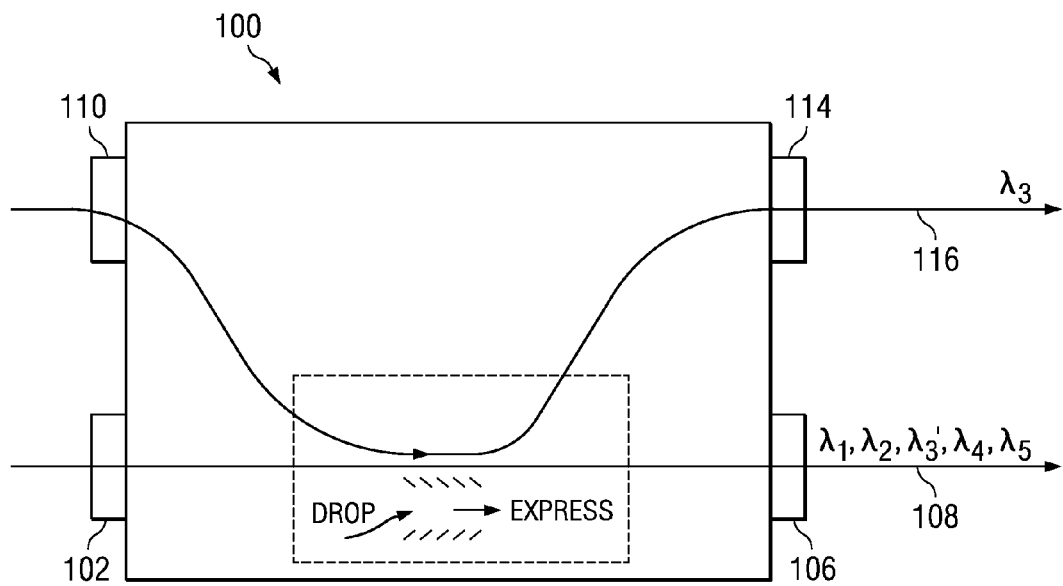
FIG. 1 is a general block diagram showing the ports to a four-port add/drop multiplexer 100 and the optical signals that enter and exit through those ports.

All of these drawings are illustrations of certain embodiments. The scope of the claims is not limited to the specific embodiments illustrated in the drawings and described below.

DESCRIPTION OF THE EMBODIMENTS

FIG. 1 is a general block diagram showing the ports to a four-port add/drop multiplexer 100 and the optical signals that enter and exit through those ports. Provided in the block diagram is an input port 102 that receives an input optical communication signal 104 and an express port 106 that outputs an output optical communication signal 108. Also provided is an add port 110 that receives an add-channel optical communication signal 112 and a drop port 114 that sends out a drop-channel optical communication signal 116. Also depicted in FIG. 1 is a general add-drop element, which in the default condition passes all the channels from the input port 104 to the express port 108, such that if the input optical communication signal 104 comprises channels $\lambda_1, \lambda_2, \lambda_3, \lambda_4, \lambda_5, \lambda_6 \ldots \lambda_N$, then the output optical communication signal 108 will comprise those same channels, substantially unaffected from their input conditions. If, however, the add-drop multiplexer 100 is configured to add a different channel ($\lambda_3'$) from the add-channel optical communication signal 112, then the output optical communication signal 108 would instead comprise channels $\lambda_1, \lambda_2, \lambda_3', \lambda_4, \lambda_5, \lambda_6 \ldots \lambda_N$, where the original $\lambda_3$ channel has now been replaced by the added $\lambda_3'$ channel. In a four-port configuration of the multiplexer 100, when the new $\lambda_3'$ channel is added to the optical communication signal, the original $\lambda_3$ channel would typically be "dropped" and would be outputted from the drop port 114 on the drop-channel optical communication signal 116. Alternatively, the original $\lambda_3$ channel might be directed to an optical dump, which essentially discards the channel.

Still referring generally to FIG. 1, the add-channel optical communication signal 112 may have the same bandwidth and number of channels as the input optical communication signal 104. Thus, while the input optical communication signal 104 may comprise channels $\lambda_1, \lambda_2, \lambda_3, \lambda_4, \lambda_5, \lambda_6 \ldots \lambda_N$, the add-channel optical communication signal 112 may comprise channels $\lambda_1', \lambda_2', \lambda_3', \lambda_4', \lambda_5', \lambda_6' \ldots \lambda_N'$. Depending on how the add-drop multiplexer 100 is configured, then, any number of possible configurations could result with regard to which channels are routed to which outputs. For example, the output optical communication signal 108 from the express port 106 could carry optical channels $\lambda_1, \lambda_2', \lambda_3', \lambda_4, \lambda_5, \lambda_6' \ldots \lambda_N'$, whereas the drop-channel optical communication signal 116 from port 114 might carry the exact complement of those channels—$\lambda_1', \lambda_2, \lambda_3, \lambda_4', \lambda_5', \lambda_6 \ldots \lambda_N$.

Depending on design considerations, however, various signals may dropped and/or added from one of the optical communication signals 104, 108 without there being a corresponding signal that is added and/or dropped from the other signal. For example, in a three-port system, for which the embodiments described in this system could also be employed, either the "add" port 110 or the "drop" port 114 is not included in the multiplexer 100 (depending on which side of the multiplexer 100 the ports are viewed from). Thus, for example, the input optical communication signal 104 may be received at the input port 102, whereupon the channels may be dropped and sent out the drop-channel port 114 without re-inserting a new channel to be transmitted from the express port 106. In this instance, the channels passed through to the express port 106 may be as follows, $\lambda_1, \lambda_2, \lambda_5, \lambda_6 \ldots \lambda_N$, with the $\lambda_4$ and $\lambda_5$ channels having been dropped without replacement in the output optical communication signal 108.

Although the four-port add-drop multiplexer 100 of FIG. 1 shows the optical signals moving in one direction through it, optical add-drop multiplexers 100 are generally bi-directional. Thus, if a communication channel (e.g., $\lambda_3'$) is added at add port 110 such that it is imparted to the "output" optical communication signal 108, in many cases there will be a corresponding communication channel proceeding along the reverse path of the added communication channel, and thereby proceeding into the express port 106 and out of the add port 110. Thus, in the reverse direction, the express port 106 functions as an input port, and the add port 110 functions as a drop port. Similarly, in the reverse direction, the drop port 116 functions as an add port, and the input port 102 functions as an express port.

In the above-described approaches, a difficulty arises when designing and constructing add-drop optical multiplexers to handle multiple channel add-drops. Such designs are typically difficult to achieve without adding undue signal insertion loss, distortion, and/or crosstalk.

Figure 2:
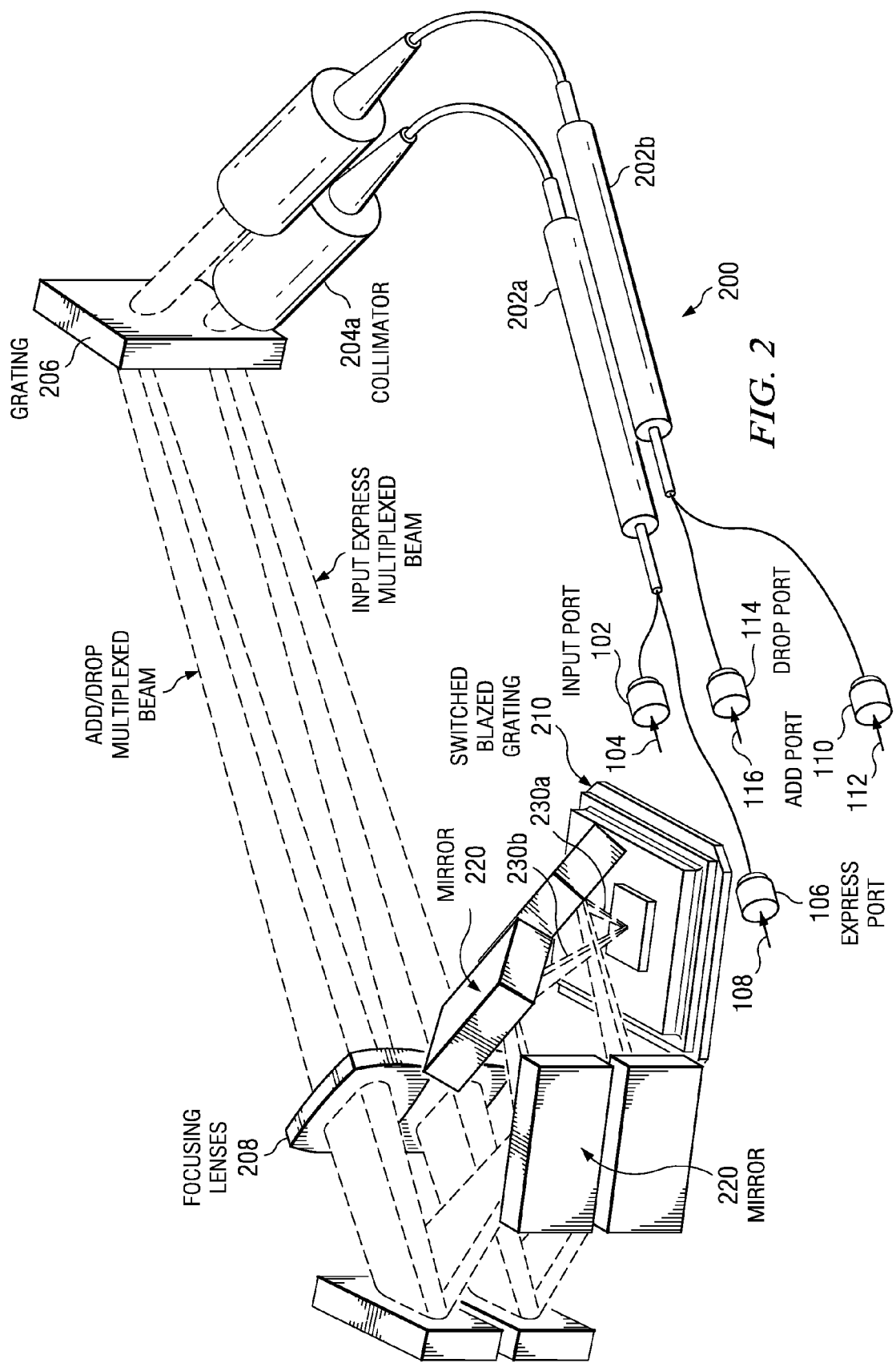
FIG. 2 is a block diagram of a reconfigurable optical add-drop multiplexer employing a spatial light modulator to selectively add and drop channels from multiplexed optical communication signals.

FIG. 2 is a block diagram of a reconfigurable optical add-drop multiplexer 200 that employs a spatial light modulator to selectively add and drop channels from multiplexed optical communication signals. In general, the input port 102 of the multiplexer 200 receives an input optical communication signal 104 and passes that signal on to a first circulator 202a. The input optical communication signal 104 passes through the circulator 202a and on to the collimator 204a. The optical signal 104 is then collimated and passed through a transmissive grating 206, which diffracts the different wavelengths of the signal by different degrees, thereby ultimately spatially separating the 1 through N channels as those channels travel from the transmissive grating 206. A lens 208 is then provided to focus the beams onto the surface of a DMD or other Switched Blazed Grating ("SBG") 210.

In the above example, the number of channels, "N," can vary according to the optical communication signals that are being handled by a multiplexer. In a C-band application with 100 GHz spacing, for example, there might be 44 separate channels. If the spacing can be reduced to 50 GHz, the number of channels can be doubled to 88, and so on. The grating 206 is shown as a transmissive grating, but it could also be a reflective grating. While gratings are shown to impart an angular separation between different wavelength channels of the optical communication signals, thereby causing a spatial separation between those channels as they propagate through the multiplexer, other elements may be used to impart a spatial separation between the different wavelength channels. Other technologies, such as ArrayedWaveguide Gratings (AWGs) may be employed in a similar manner to disperse the wavelengths. The grating disperses the different wavelengths of the optical signal by different angles; the higher the wavelength, the larger the dispersion angles. Each channel/wavelength will still remain in collimated space, but will be separated from the different channels/wavelengths by different dispersion angles due to the grating 206.

The lens 208 may be a plano-convex lens, which is preferably configured with a focal length equal in one dimension to its optical distance from the grating in order to stop the divergence of the channels coming off of the grating, and configured with a focal length equal to its optical length from the SBG 210 in the other dimension, so as to focus the multiple channel wavelength spots 312 (see FIG. 3) into as small of areas as possible on the surface of the SBG 210. In other words, the wavelengths are redirected by the lens 208 to be parallel to each other, but each individual wavelength $\lambda_n$ is focused at its particular spot 312 (see FIG. 3) on the SBG 210. The spot size 312 or diameter of the projected channel of the optical signal, and its separation from other channels, depends on the optical design of the system including the focal length of the lens 208, the diameter of the collimator 204 and the grating's 206 dispersion characteristics.

Figure 3:
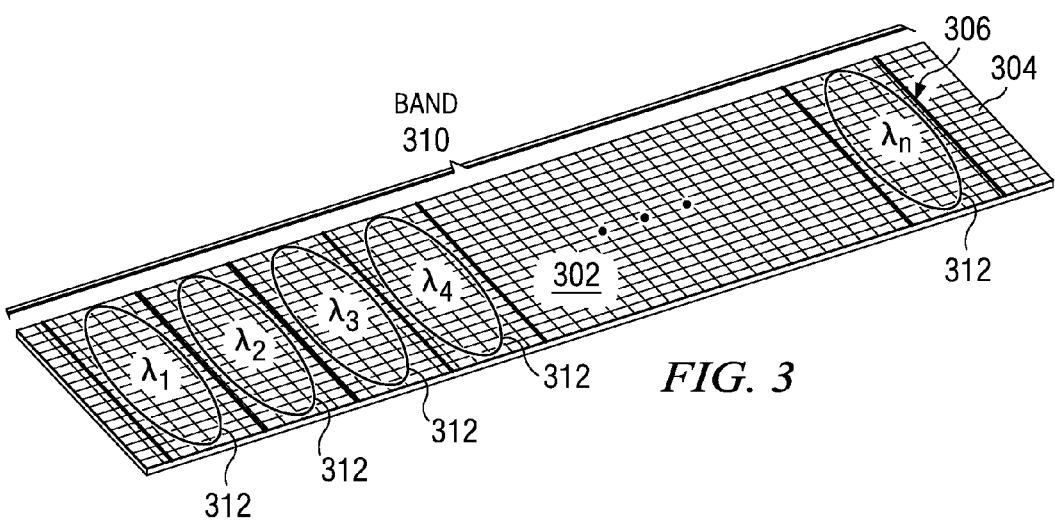
FIG. 3 is a diagram of the surface of a spatial light modulator employed to selectively add and drop channels, illustrating the spots formed by the dispersed beams on the surface.

FIG. 3 is a diagram of the surface 302 of the DMD or other switched blazed grating 210. Shown on the surface 302 are a plurality of individual pixel elements 304. These individual pixel elements are, in one embodiment, individual DMD mirrors, which can be individually switched on and off by circuitry underlying the DMD pixels on a semiconductor substrate. In such an embodiment, the array may be a 768×1024 array, although many other array dimensions could be used.

Also shown on the surface 302 of the SBG 210 are a number of segments or sub-arrays 306 of pixels 304. The segments represent divisions of the area in which the multiple channels optical signal can be directed from the lens 208 and the multiple folding mirrors 220 (see FIG. 2). In this description of the embodiments, the area in which the plurality of channels of the optical signal strike the SBG 210 will be referred to as the band 310. Each channel, for example will shine on the SBG, typically as a circular or oval spot 312. The channel spots 312 are generally each contained within an assigned segment 306. Thus, as shown here, there would be a segment 306 devoted to receiving spots 312 associated with a first channel, $\lambda_1$, a second channel $\lambda_2$, a third channel $\lambda_3$, and so on, up until an Nth channel $\lambda_N$. Within each segment 306, the intensity distribution of the spot 312 will be Gaussian in shape due to the mode of the single-mode fiber.

The multiple segments 306 are designed in this application to capture substantially all of the energy for the segments' assigned channels. The segments may be designed, for example, to contain the $1/e^2$ area of the channel, which is the area containing approximately 86.5% of the power of the incoming channel signal. The segments 306 contain multiple mirrors or other pixels 304, and the number of the pixels 304 in a segment 306 may vary according to available technology or other design requirements. In implementations presently envisioned for the described embodiments, the pixels 304 may be arranged in a sub-array of pixels comprising approximately 100 elements. The sub-arrays or segments 306 may alternatively provide fewer pixels, such as from fifty to approximately 100 pixels, or more pixels, such as hundreds of pixels or more.

Figure 4A:
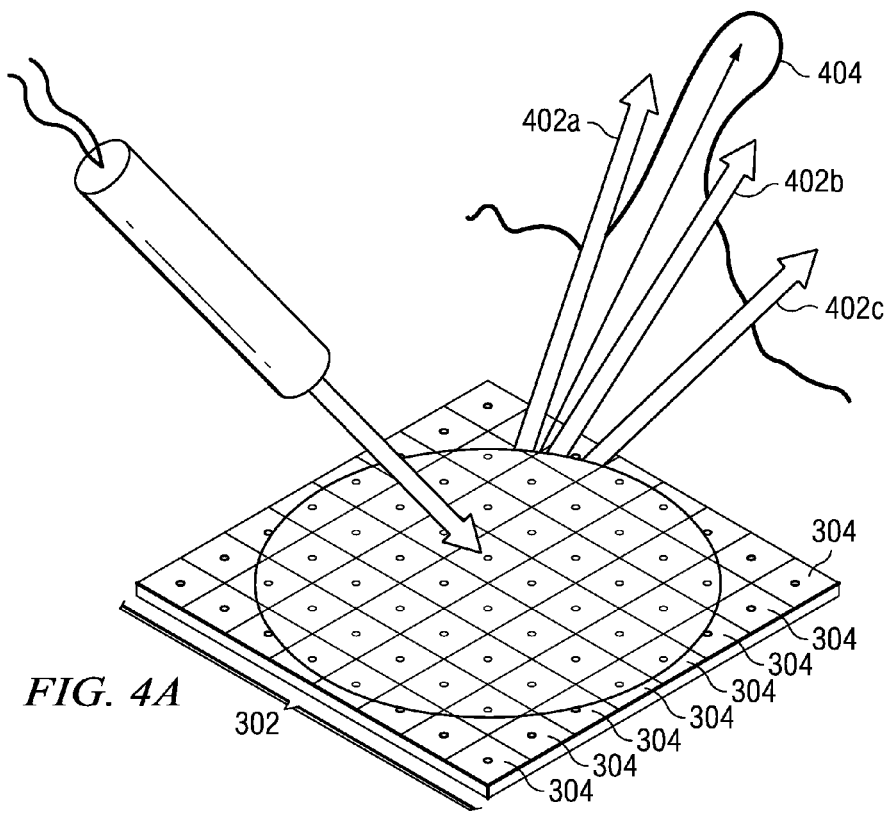
FIGS. 4A-4B are diffraction order intensity graphs superimposed above the surface of a spatial light modulator as described in this application.
Figure 4B:
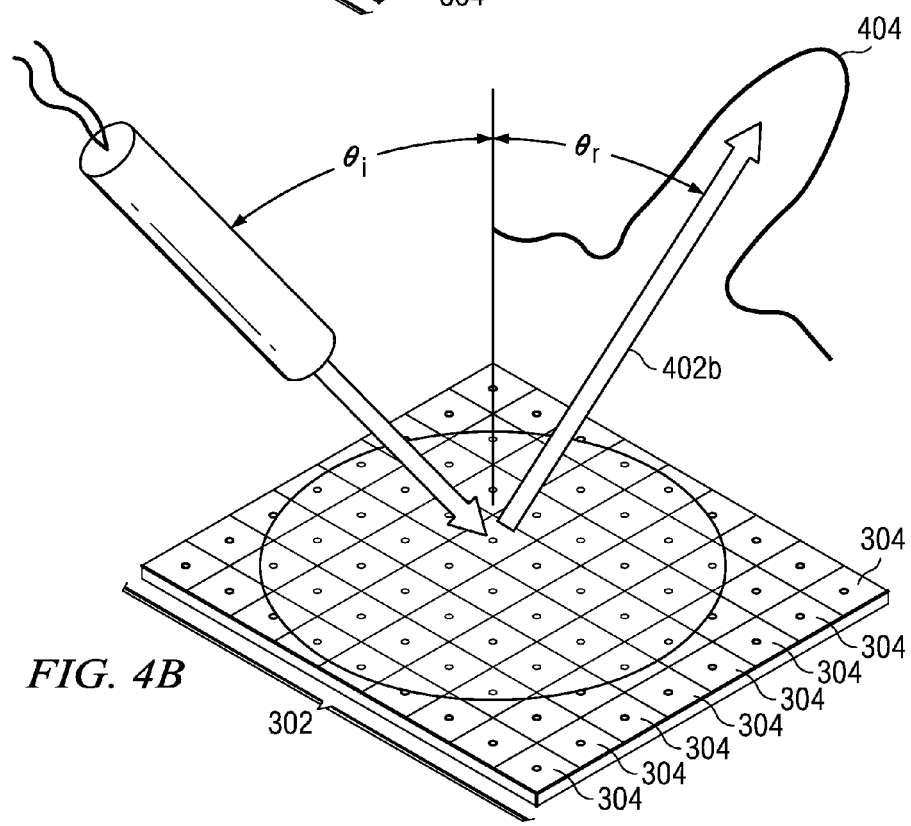

As illustrated in FIGS. 4A-4B, in the DMD-based embodiments described in this application, because the DMD surface 304 is a periodic pattern of reflective pixels 302, and due to the nature of the incoming coherent light, there are diffraction orders 402a-c in the reflection from the DMD surface 304. Accordingly, and as shown in FIG. 4B, the incident light may be positioned with an incident angle $\theta_i$, and the DMD device is designed with that incident light to optimize the reflected light energy such that as much energy as possible is concentrated into a single diffraction order, which in this instance is the second diffraction order 402b. In some instances, there may be particular patterns of on and off DMD pixels that will better maximize the optical coupling relative to an "all on" pattern. Further, the tilt angle of the DMD pixels 304 can be optimized to align the specular reflection off the mirrors into a particular order. For one implementation of the above circuitry, the optimized second order reflection angle was approximately 9.2 degrees for a C-band optical signal, which has a wavelength spectrum from approximately 1520-1560 nm. The Fraunhofer envelope 404 of the specular reflection is accordingly concentrated in the second order 402b, and that second order is in turn directed to the outgoing optical signal components in the system. Thus, in this example, the second-order reflection 402b is directed toward the second light path that, in the embodiment of FIG. 3, will be directed toward the drop port 114, from which the dropped-channel optical communication signal 116 will emanate. Alternatively, the second-order reflections may be directed to an optical dump, which essentially discards the dropped channels. The use of the second-order diffraction orders 402b in the embodiments described in this application is exemplary. Other diffraction orders, including the first order diffraction 402a or the third order diffraction 402c, may be advantageously used based on system design considerations.

Figure 5A:
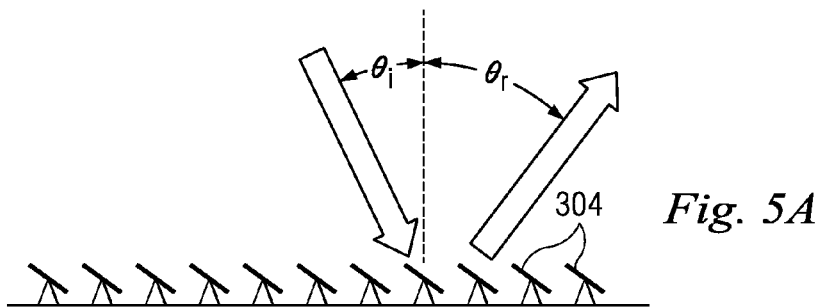
FIGS. 5A-5B are perspective views of incident and reflected light signals upon the surface of a spatial light modulator in which the system has been designed to contain much of the reflected light energy in the second diffraction order.
Figure 5B:
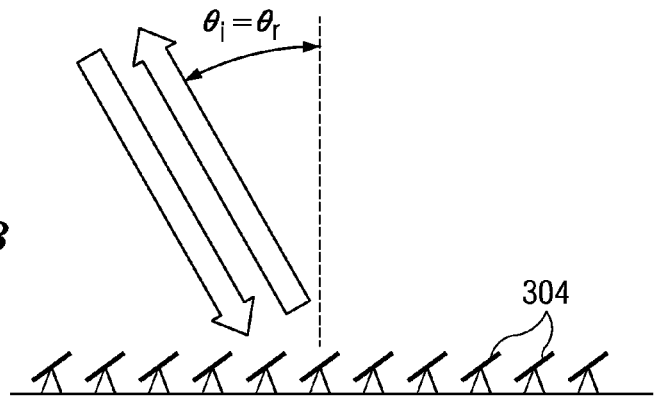

Through optical system design, as illustrated in FIGS. 5A-5B, significant reflected diffraction orders can be sent back along the first optical path for the incoming optical signal. Reflections from the DMD surface 302 can be characterized by $\sin \alpha + \sin \beta = m\lambda/d$, where $\alpha$ is the input angle, $\beta$ is the reflected angle, m is the order, $\lambda$ is the wavelength, and d is the periodicity of the array. The angles above are relative to the normal surface of the mirrors, which are tilted in a first direction in FIG. 5A and in a second direction in FIG. 5B. Normal angles to the plane of the surface, however, are shown in the figure as $\theta_i$ and $\theta_r$ for the incident and reflected angles, respectively. When $\alpha = \beta$, the optics are in the Littrow condition, which is a very efficient condition of a grating. This condition also results in $\theta_i$ being equal to $\theta_r$ and thereby the channels coming in on a first path can also be reflected back on that same path although traveling in a different direction. In implementations of these embodiments, the incident angle ($\theta_i$) for efficient reflection of the light in the Littrow condition is approximately 9.2 degrees as discussed above. A second path is defined by toggling the mirrors or pixels 304 in the other direction, which results in a reflected angle ($\theta_r$) of approximately 28.4 degrees.

Referring again to FIG. 2, the light beams entering and exiting the four ports of the exemplary multiplexer 200 are routed through circulators 202a,b. One circulator 202 is provided for each of the two ports. One circulator 202a in this embodiment is connected to the input port 102 and express port 106 of the multiplexer 200. The other circulator 202b is connected to the add port 110 and the drop port 114. Each circulator 202 has three ports in this instance.

The circulator 202 is able to discern the direction of the signal through polarization optics contained in the circulator such that after the signals have propagated through the multiplexer they can still be identified relative to each other and properly routed to the correct one of the input and express ports 102, 106 for output. Optical signals traveling into the circulator 202a through the input port 102 or into circulator 202a through the express port 106 will both pass on to the collimator 204a through the circulator 202a, but since the circulator is able to distinguish the direction of the signal through polarization techniques, light signals entering from the input port 102 and the express port 106, the input port optical signal 104 can be made to exit the multiplexer 200, upon reflection, through the express port 106 and the optical signal entering the express port 106 can be made to exit the multiplexer 200, upon reflection, through the input port 102. Other embodiments accomplish the proper passage of the signals through the four ports without circulators, as will be described with respect to other embodiments disclosed in this application. An advantage of the circulator design, however, comes from a generally more favorable system optical path design.

Still referring to FIG. 2, with further reference to FIGS. 3-5 as was previously described, the input optical communication signal 104 passes in the multiplexer 200 through the circulator 202a, collimator 204a, grating 206, and lens 208. Fold mirrors 220 are provided to direct the signal 104 along a first path 230a onto the surface 302 of the SBG 210, with the multiple channels distributed diagonally across the surface 302 as shown in this figure, an example of which is shown in greater detail in FIG. 3. As was discussed above, the channels can be independently directed back along the first path by positioning the set of mirrors upon which the particular spot 312 is directed such that the incident angle of that channel of the input optical communication signal 104 effectively strikes the mirrors at the Littrow angle. The channels of the input optical communication signals that are reflected back along the first path will join other channels, as is further discussed below, and collectively these channels will now effectively be the output optical communication signal 108.

The collection of channels that comprise the output optical communication signal 108 proceeds along the first path from the surface 302 of the SBG 210 back through the fold mirrors 220 and to the lens 208. The lens 208 will re-converge the various channels as they propagate back toward the grating 206. The grating 206 will then realign the propagation angles of the channels and direct the now-focused and parallel beams toward the collimator 204a. The lens 208 and diffraction grating 206, with the spacing between them, accordingly receive a plurality of spatially separated channels transmitted by the spatial light modulator and spatially combine the plurality of received channels. Other optical components, however, can provide this same function to spatially combine the multiple wavelength channels. These same components were described as providing both the spatial separation and the spatial combination of the multiple wavelength channels of the optical communication signals propagating through the multiplexer. Different sets of components can, however, be used to spatially separate the channels than were used to spatially combine the channels. Further, multiple sets of these components can be used to operate on the different optical communication signals traveling through the multiplexer rather than using a single set of such components. Optical components such as Arrayed Waveguide Gratings ("AWGs") can also be incorporated into the multiplexers disclosed in this application in order to spatially separate and/or combine multiple channels of optical signals.

From the collimator 204a, the signal propagates back toward the circulator 202a, whereupon, due to proper polarization design, these signals will exit the circulator 202a through the express port 106 to form the output optical communication signal 108.

Because the input and output optical communication signals 104, 108 are bi-directional, there will also be incoming optical communication signals at the "express" port 106 and outgoing optical communication signals at the "input" port 102. Thinking of these signal components as proceeding "backward" through the multiplexer 200 relative to the propagation directions described above, these signals will generally be treated the same way as their matched signal components traveling in the "forward" direction. Since the circulator 202 is able to discern the direction of the optical signal through polarization optics, the circulator 202 can route the signal that originated from the input port 102 (or the add port 110, as will be further discussed) to the express port 106 and the signal that originated from the express port 106 (or the drop port 114, as will be further discussed) to the input port 102.

In a similar manner as was discussed above with respect to the input port 102 and the express port 106, the add port 110 and the drop port 114 pass their received signals through a second circulator 202b. The add port 110 receives an add-channel optical communication signal 112, which propagates through the circulator 202b. As with the input optical communication signal 104, the add-channel optical communication signal 112 passes through a collimator 204b, grating 206, and lens 208. The multiple channels of the signal 112 are made to diverge at varying angles by the grating 206 according to their wavelengths, and the lens 208 focuses the multiple channel spots 312 (see FIG. 3) onto the surface 302 of the SBG 210. The incident angle of the second light beam 230b on the second path is chosen to correspond with the non-Littrow reflection angle of the first light beam 230b striking the spot on the surface 302 of the SBG 210 when the mirrors are tilted away from the first light beam. In other words, the channels of the first light beam 230a that derived from the input optical communication signal 104 are either reflected back along the first path, which is the path of incidence of the first light beam, or along a second path, which is the path of incidence of the second light beam 230b; the channels of the second beam 230b that derived from the add-channel optical communication signal 112 are directed onto the surface 302 of the SBG 210 along a second path, whereupon they are either reflected along the first path if the particular channel is to be added, depending on the orientation of the sub-arrays 306 of pixels upon which the channels are incident. For any given wavelength or combination of wavelengths from the input signal 104 may be dropped to the drop port 116 by the SLM 200 while the remaining wavelengths are routed to the express port 108. For any of the wavelengths that have been selectively dropped from the input signal 104 to the drop port 116, the same corresponding wavelengths from a different source may be simultaneously added from the add port 112, recombined, and routed to the express port filling the vacant channels that been dropped.

The incoming optical communication signals 104, 112 actually propagate in both directions, but the embodiments described above are designed such that when signals are routed in one direction, the corresponding signals (i.e., the signals entering in through the "express" port 106 and "drop" port) are also properly routed in the other direction.

FIG. 6 shows an embodiment of a multiplexer 600 of a similar design to the multiplexer 200 of FIG. 2, but in which circulators are not used. Thus, while this multiplexer also comprises four ports—input 102, express 106, add 110, and drop 114—the signals at those four ports are connected to four separate collimators 604a-d. As with the embodiment of FIG. 2, the collimators 604 collimate the incoming light and send it through the grating 606, which may be a transmissive or reflective grating 606. The grating diffracts, transmissively or reflectively, the wavelength channels of one of the optical signals—input 104, express 108, add 112, and drop 116—thereby, as the signals propagate toward the lens 608, the channels they comprise will become spatially separated. The lens 608 will then focus the beams onto the surface of the SBG 210, which may be a DMD or a spatial light modulator of another technology. Optical signals 104, 108 entering through the input port 102 and express port 106 strike the surface 302 of the SBG 210 traveling along first path 630a. Optical signals 112, 116 entering through the add port 110 and drop port 114 strike the surface 302 of the SBG 210 traveling along the second path 630b.

Figure 7:
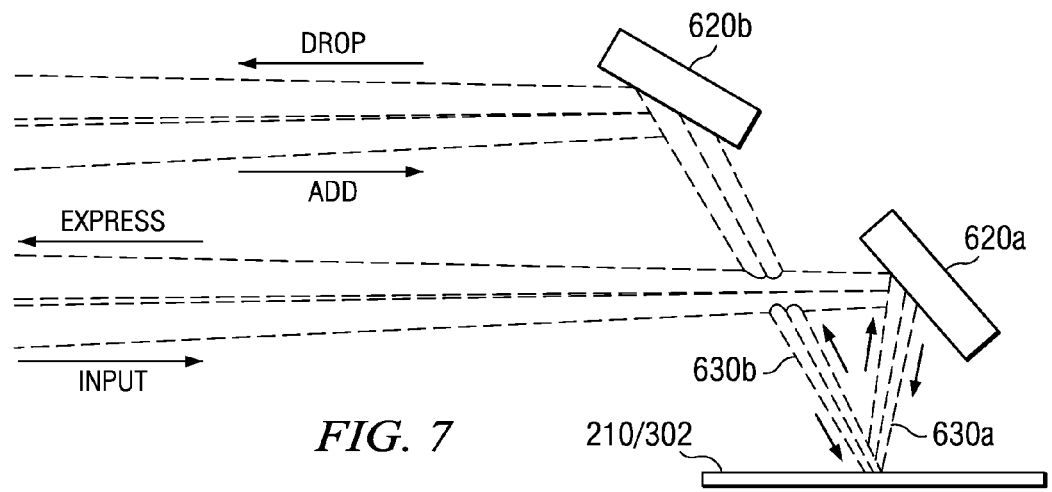
FIG. 7 provides a more focused view of the optical path reflections at the surface of the Switch Blazed Grating applying Littrow-based path reflections.

FIG. 7 provides a more focused view of the optical path reflections at the surface 302 of the SBG 210 applying Littrow-based path reflections. Similar to the previously discussed circulator approaches, channels of the optical input communication signals strike the surface 302 of the SBG 210 through a first path 630a. If the particular channel is intended to be passed through to the express port 106 the channel light beam is reflected back along the first path and back up to the first fold mirror 620a. If, however, the particular channel is intended to be passed to the drop port 114, the segment or sub-array 306 of pixels 304 are configured to direct the light beam associated with that channel instead to the second fold mirror 620b over the second path 630b. In this approach, as contrasted to the circulator approach, the input optical communication signal 104 approaches at a slightly different angle than the output optical communication signal 108. One or both of the signals accordingly will be slightly off of the Littrow angle.

Still referring to FIG. 7, similar optical principles apply for the add-channel optical communication signal 112 and the drop-channel optical communication signal 116 to the optical principles discussed for the input and express optical communication signals 104, 108. In this approach, the signals 104, 108 approach the surface 302 of the SBG 210 as directed by the second fold mirror 620b over the second path 630b. If the particular channel of the add-channel optical communication signal 112 is to be added to the input signal 104 and transmitted as the express signal 108, the pixels 304 of the segment 306 direct the light beam associated with that channel along the first path where it joins up with the output communication signal 108, being reflected by the first fold mirror 620a, and passing through the lens 608, grating 606 and collimator 604b.

Figure 8A:
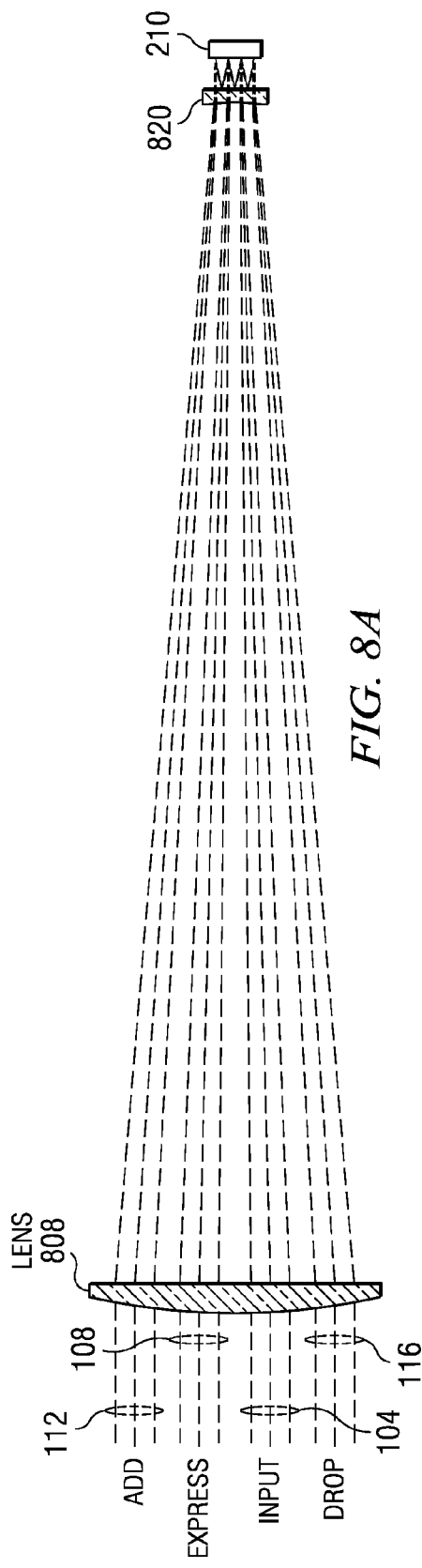
FIG. 8A shows an approach in which four spatially separated optical communication signals are defined within the multiplexer for the four ports of the multiplexer.

FIG. 8A shows an approach in which four spatially separated optical communication signals are defined within the multiplexer for the four ports of the multiplexer (not shown, the approach shown here could be applied within the embodiment disclosed above with respect to FIG. 6 or with respect to another embodiment that provides separated optical signals in the multiplexer). Not shown in this figure are elements such as the collimators that would interface the optical signals from fiber optic inputs or other optical transmission means, and a grating that will provide the separation between the multiple wavelength channels of the optical communication signals. Other elements, such as those described in the previous embodiments, may also be included. Thus, in one embodiment of this FIG. 8A, a diffraction grating would be provided to the left of the elements, and the diffraction grating would provide angular separation of the optical channels into and out of the page. Further, the lenses 808, 820, while focusing the beams vertically as shown on this page, would still maintain spatial separation between the multiple wavelength channels into and out of the page such that the channels remain spatially separated as they strike the SBG 210, forming optical spots 312 on the surface 302 of the SBG 210.

Figure 8B:
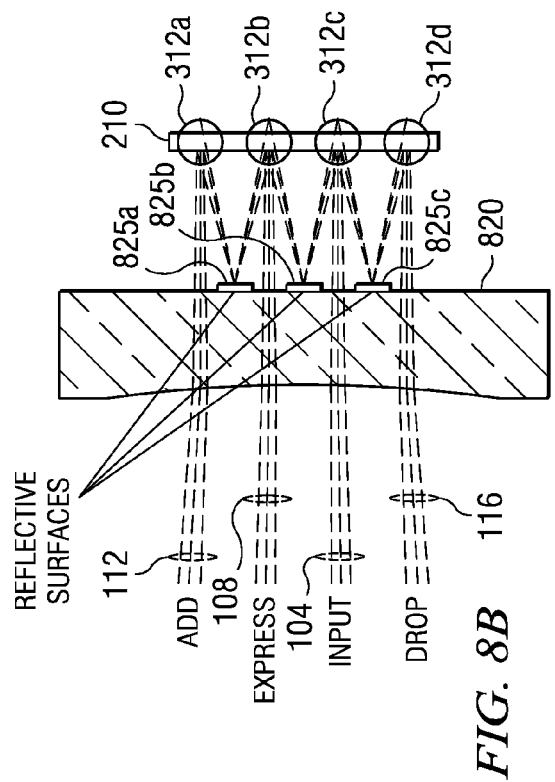
FIG. 8B provides a more focused view of the area where the lens focuses the optical signals on the surface of the Switched Blazed Grating.

FIG. 8B provides a more-focused view of the area where the lens 820 focuses the optical signals on the surface of the SBG 210. The first lens 808 in this embodiment receives the optical signals and focuses them toward the second lens 820 and the SBG 210. The second lens 820 is further provided in this instance as a negative cylindrical lens 820 to reduce the angle of incidence onto the SBG 210.

As can be seen in the FIG. 8B, reflective surfaces 825a-c direct optical signals reflected from the surface 302 of the SBG 210 back again to an adjacent area of the SBG 210. Specifically focusing initially on the input optical communication signal 104, depending on the orientation of mirrors/pixels 304 on DMD-type SBGs 210 or on other elements operable to direct the incoming light signals, the input signal 104 can be directed up or down. The optical signal strikes the surface 302 of the SBG at spot 312c, and for example can be directed down to the reflective element 825c. From the reflective element 825c, the optical signal is is further reflected down to the spot 312d and back out through the lens 820 as a part of the drop-channel optical communication signal 116. When the incoming input optical communication signal 104 is directed upward, it is reflected off of reflective element 825b and is further directed up to spot 312b on the surface 302 of the SBG 210. The input signal is further then reflected out as a part of the output optical communication signal 108. The reflective elements 825 may be a reflective face of the lens 820, or they may be mounted to the front or the back of the lens (farthest or closest to the SBG 210).

An incoming component of the output communication signal 108 can further be directed out the add-channel communication signal 112 through spot 312b, reflective surface 825a, and spot 312a or out the input optical communication signal 104 via spot 812b, reflective surface 825b, and spot 312c. Similarly a signal coming in on the drop-channel communication signal 116 can be directed as illustrated out the input optical communication signal 104 and a signal coming in on the add-channel communication signal 112 can be directed out the output optical communication signal 108 as illustrated.

In embodiments described above, if particular channels are routed as described above, such routing is employed bi-directionally. Further, although the spots are described as single spots 312a-d, there are actually four spots for each channel—one spot 312 each for the four separate optical signals shown.

Figure 9:
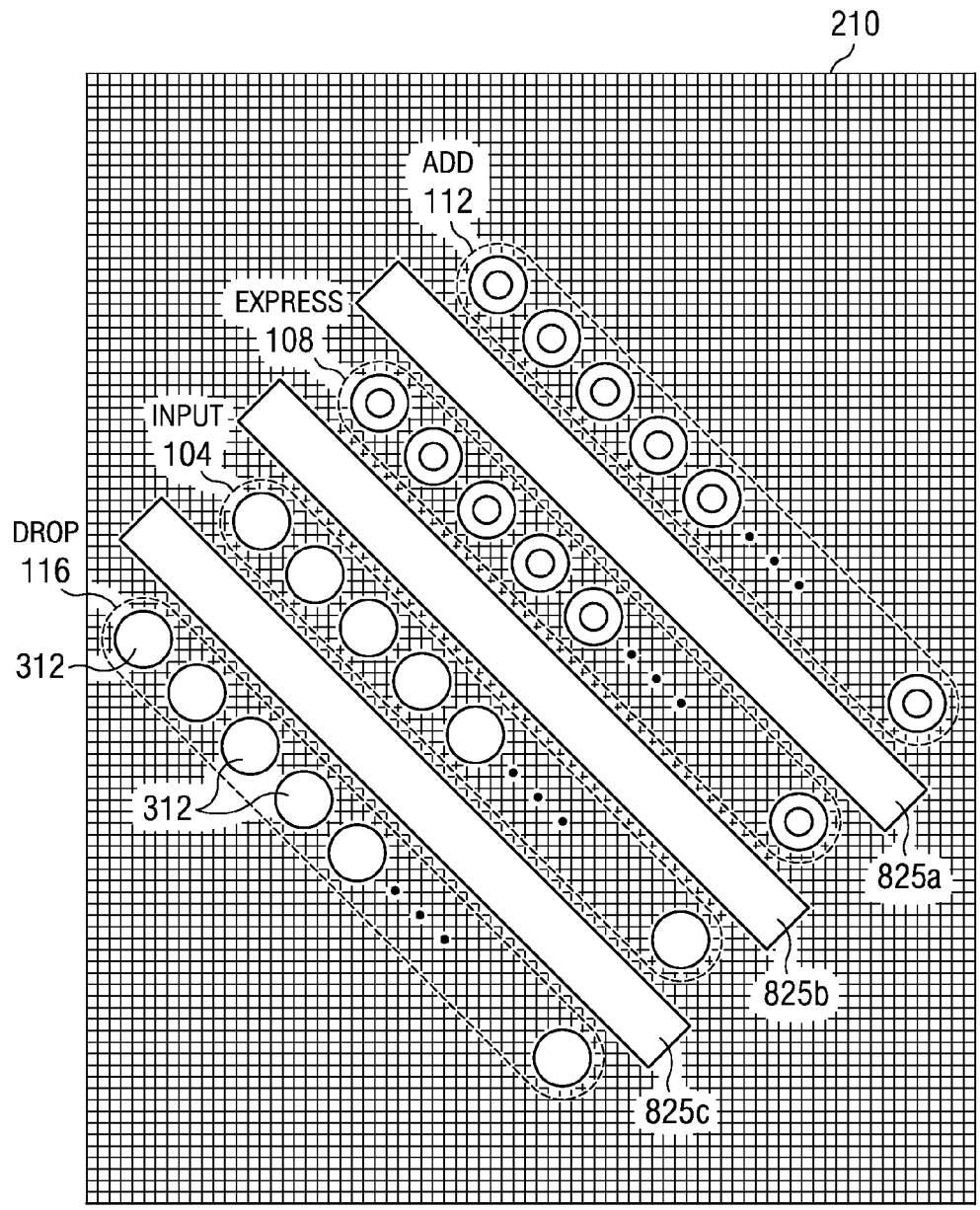
FIG. 9 provides a top view of the Switched Blazed Grating, showing how the multiple channel spots are arranged diagonally for the four different optical signals.

FIG. 9 provides a top view of the SBG 210, showing how the multiple channel spots 312 are arranged diagonally for the four different optical signals—input optical communication signal 104, output optical communication signal 108, add-channel optical communication signal 112, and drop-channel optical communication signal 116. Each of these signals is comprised on the surface 302 of the SBG 210 as N spots 312, where N is the number of optical channels being transmitted on the optical signals 104, 108, 112, 116. The reflective elements on the back of the lens 820 are shown in the figure as the rectangular bars 825a-c. As can be seen from this top view, each channel spot 312 lines up symmetrically across one or two of the bars 825a-c with the adjacent signals to which those channels can be switched.

Figure 10:
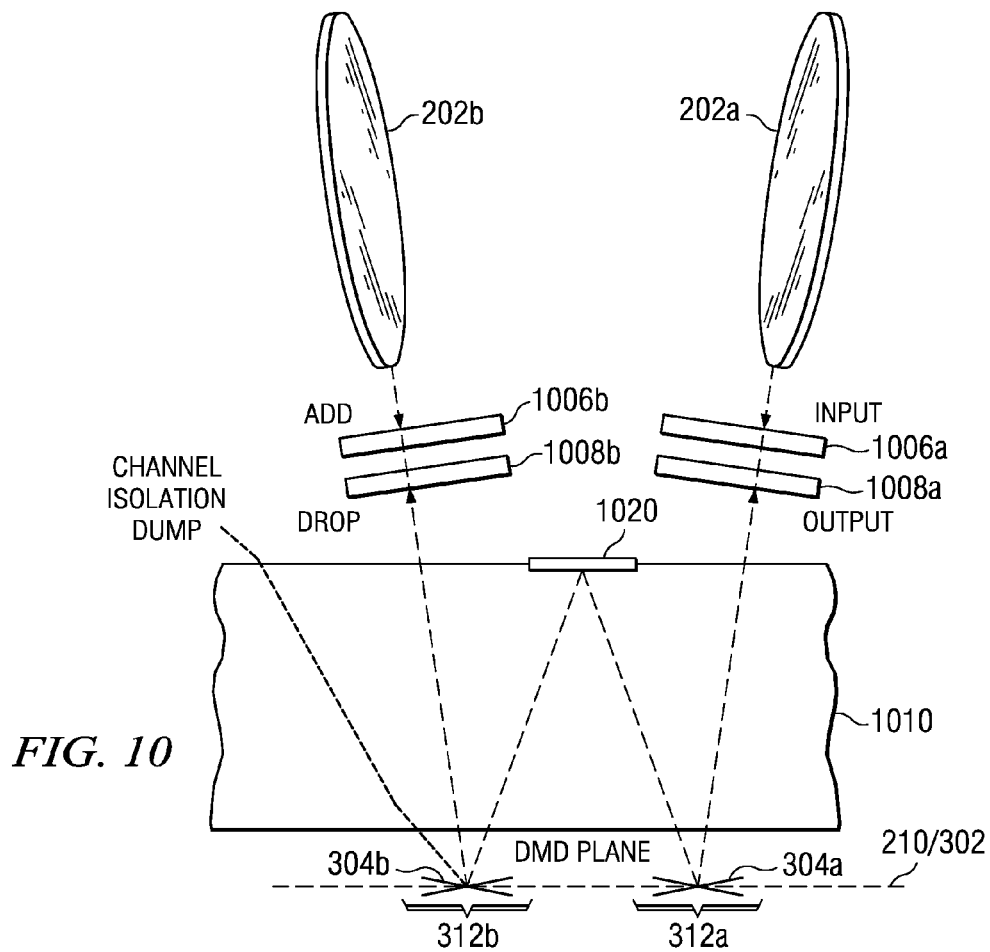
FIG. 10 illustrates an approach that uses Littrow-angle modulation with circulators to direct optical signals back along their incoming paths or along a different optical path.

FIG. 10 provides an approach that uses Littrow-angle modulation with circulators 202 to direct optical signals back along their incoming paths or along a different optical path. Together with the circulators is a window 1010 that comprises a reflector 1020, which is used to reflect light between spots 312a and 312b on the surface 302 of the SBG 210. In accordance with this embodiment, an input optical communication signal 104 is received through the input port 102 at the circulator 202a, whereupon the signal is passed through a grating 1006a and a lens 1008a to respectively disperse the multiple channels of the optical signal and to focus the optical signal upon the surface 302 of the SBG 210. At spot 312a, the pixels 304a can then direct the channels from within the signal 104 back to the circulator 202a as a part of the output optical communication signal 108 through the express port 106 or at the reflector 1020. The reflector 1020 reflects the channel signal back to the SBG 201 at spot 312b comprising pixels 304b, whereupon the channel signal can be directed toward the circulator 202b through the lens 1008b and grating 1006b.

As is illustrated in this embodiment, not all of the channel capacity of any particular optical signal is utilized. In this embodiment, for example, incoming channels from the add-channel optical communication signal 112 can be dumped by the pixels 304b to a channel isolation dump rather than being passed alternatively to the outgoing drop-channel optical communication signal 114. This design may also be effected in other of the embodiments described in this application where it is not a design objective to preserve all the incoming channels of, for instance, the add-channel optical communication signal 112 or the drop-channel optical communication signal 116.

Alternatively, some of the signal from the input port, for example, may be partially dumped for any selected channel by selecting only portion of the total pixels encompassing each channel. In this manner, the signal routed to the express or drop channel may be partially attenuated such that the optical configuration may serve not only as an optical add/drop but also as a spectral equalizer.

The particular optical alignment angles employed here are not critical, and will be chosen based on the optical design requirements of particular design. As with all of the above embodiments, particular measurements, angles, and distances are not critical to the novel aspects of the embodiments described. Workers using ordinary skill to implement the inventive concepts disclosed and claimed in this application will determine such measurements, angles, and distances.

Figure 11:
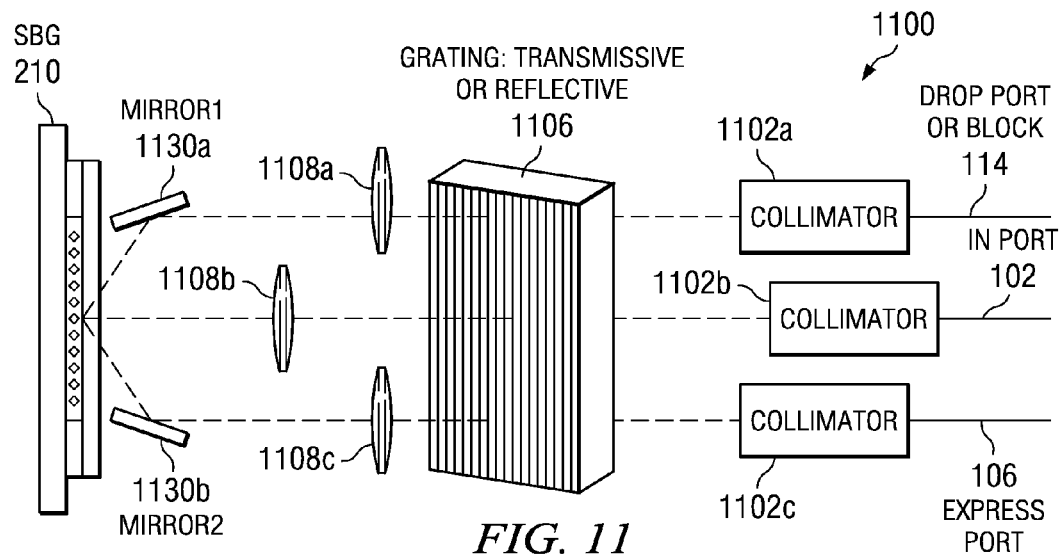
FIG. 11 illustrates a block diagram for a three-port optical multiplexer.

FIG. 11 illustrates a block diagram for a three-port optical multiplexer 1100. Provided in this multiplexer is an input port 102, an express port 106, and a drop port 114. According to this embodiment, collimators 1102*a-c* collimate light beams coming in on the ports 102, 106, 114 and provide such optical signals to and from a grating 1106. Lenses 1108*a-c* are provided to focus light coming into and out of the SBG 210. Fold mirrors 1130*a-b* are used to direct the light beams to and from positions on the surface 302 of the SBG 210.

In accordance with the three-port model, channels of the input optical communication signal 104 can be passed through to the express port 106 and out of the system as the output communication signal 108 or to the drop port 114 and out of the system as a drop-channel optical communication signal. Optionally, the channels being routed to the drop port 114 may also just be dumped from system as an unwanted signal.

Although optical signals are generally described above as proceeding in a single direction, such optical signals are usually bi-directional in practical applications, and thus the "input" optical communication signal 104 will comprise a signal component entering the multiplexers 200, 600, 1100 and a signal component leaving the multiplexers 200, 600, 1100 at the input port 102. The output optical communication signal would similarly have components entering and exiting through the express port 106. The add-channel and drop-channel optical communication signals 112, 116 would also be bi-directional through their respective ports 110, 114. The add-channel and drop-channel optical communication signals 112, 116 may carry one or more optical communication channels. In some applications, when a particular channel is added to the input signal, that same channel of the input signal is dropped and will be transmitted from the multiplexers 200, 600, 1100 at the drop-channel optical communication signal 116 at the drop port 114.

A few preferred embodiments have been described in detail hereinabove. It is to be understood that the scope of the invention also comprehends embodiments different from those described, yet within the scope of the claims. Words of inclusion are to be interpreted as nonexhaustive in considering the scope of the invention. While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass such modifications or embodiments. Applicants intend that none of the following claims invoke the application of 35 U.S.C. §112 ¶116 unless they are written in "means-plus-function" or "step-plus-function" format.

What is claimed is:

1. An optical device comprising a reconfigurable optical add/drop multiplexer, including: a digital mirror device having an array of selectively positionable micromirrors; first and second lens; the first lens being configured for directing optical signals between input, express, add, and drop ports, and a front of the second lens; and the second lens being configured for passing optical signals from the input and add ports through the first lens at reduced angles of incidence onto respective corresponding input and add areas of the micromirror array, and for passing optical signals from express and drop areas of the micromirror array at reduced angles of reflection through the first lens toward the express and drop ports; and reflective elements configured for selectively directing optical signal from an input area to one of the express or drop areas depending upon selective positioning of a first set of the micromirrors, and for selectively directing optical signals from the add area to the express area depending upon selective positioning of a second set of micromirrors, wherein the second lens is a negative cylindrical lens.

2. The device of claim 1, wherein the reflective elements are located on a back face of the second lens.

3. The device of claim 2, wherein the reflective elements comprise spaced rectangular bars.

4. The device of claim 3, wherein the bars are positioned in alignment between respective pairs of the add, express, input and drop areas.

5. The device of claim 4, further including a diffraction grating configured for spatially separating input optical signals into different wavelength optical signal channels for direction from the input and add ports onto respective corresponding different channel input and add areas of the micromirror array.

6. The device of claim 5, wherein the diffraction grating is further configured for spatially combining output optical signals of different wavelengths for direction from respective corresponding different channel express and drop areas of the micromirror array toward the express and drop ports.

7. The device of claim 6, further including a collimator configured for collimating input optical signals directed from the input port to the diffraction grating.

8. The device of claim 7, wherein the collimator is further configured for collimating output optical signals directed from the diffraction grating to the express port.

9. The device of claim 8, further including a second collimator configured for collimating input optical signals directed from the add port to the diffraction grating.

10. The device of claim 9, wherein the second collimator is further configured for collimating output optical signals directed from the diffraction grating to the drop port.

11. The device of claim 10, further including a first circulator for transmitting optical signals between the input and express ports and the first collimator, and a second circulator for transmitting optical signals between the add and drop ports and the second collimator.

* * * * *